ated Dec. 21, 1971

United States Patent Office 3,629,202
Patented Dec. 21, 1971

1

3,629,202
TREATING POLYESTERS WITH ORGANIC ACIDS
FOR IMPROVED STABILITY
Russell Gilkey and Thomas Hamilton Wicker, Kingsport, Tenn., assignors to Eastman Kodak Company, Rochester, N.Y.
No Drawing. Filed Sept. 12, 1969, Ser. No. 857,589
Int. Cl. C08g 17/003
U.S. Cl. 260—75 T                    14 Claims

ABSTRACT OF THE DISCLOSURE

Polyesters of improved thermal and hydrolytic stability obtained by treating the polymers containing residues of metal condensation catalysts employed in their preparation with an acidic organic compound having an ionization constant of about $2 \times 10^{-1}$ to $2.5 \times 10^{-6}$ to remove the residues.

This invention is directed to highly polymeric polyesters having improved thermal and hydrolytic stability and to a process for their preparation. More particularly, the invention relates to polymeric polyesters from which catalyst residues have been essentially removed.

The polyesters of the present invention are the linear, high molecular weight polymers prepared as described in the literature by condensation in the presence of metal condensation catalysts of polyols and dicarboxylic acids or suitable derivatives thereof. Although the polyesters thus prepared have many valuable properties, processes which further improve the properties of the polymer are always welcomed contributions to the art.

It has now been found that treatment of polyesters in accordance with the process of the present invention removes substantially all of the metallic esterification or condensation catalyst residues contained in these polyesters without materially affecting the chemical composition of the polyesters. The removal of these catalyst residues provides a final polyester product having greatly improved thermal and hydrolytic stability and improved resistance to weathering. The process of the invention also removes from the polyesters colored impurities thereby providing in addition a product of improved color.

The polyesters treated in accordance with the process of the invention can be melt processed over a wider range of temperatures with very little degradation and loss in inherent viscosity. Thus, the products of the invention are of particular value in the manufacture of extruded film, sheet and molded objects because of their resistance to molecular weight degradation, the absence of bubbles due to thermal decomposition during melt extrusion and the superior color and stability of the formed articles. In addition, the ester linkages in the polyesters of the invention interchange at a slower rate than those of untreated polymers when included in multi-component blends.

2

The improved polymer of the invention is obtained by contacting the polyester containing residues of metal condensation catalysts employed in the production thereof with an acidic organic compound having an ionization constant of about $2 \times 10^{-1}$ to about $2.5 \times 10^{-6}$ to provide residues of said metal catalyst in a form removable from the polyester and then separating the metal catalyst residues and the acid organic compound to recover the improved polyester.

The polyester contacted with the organic acid compounds of the invention may be either in solid form or in solution and the metal residues dispersed or dissolved in the polymer may be extracted therefrom by the acidic organic compounds which are selective solvents for the metal catalyst residues. Alternatively, the acidic organic compounds of the invention may be added to a solution of the polymer in water-immiscible solvents to convert the metal catalyst residue to a water-soluble form which can be easily removed by a liquid-liquid extraction with water. Thus, the acidic organic compound-contacting step of the present invention provides the metal catalyst residues in a form that can be removed from the polyester which form is either an acidic organic compound-metal catalyst residue extraction mixture or a water-soluble reaction product of the metal catalyst and the acidic organic compound. The residues of metal catalyst removed by the present invention may be dissolved or dispersed in the polymer in their original catalyst form, as a derivative of the original catalyst or as reactants or reaction products.

The acidic organic compounds of the invention, as aforementioned, are those having ionization constants of about $2 \times 10^{-1}$ to $2.5 \times 10^{-6}$ and sufficient solvent power alone or in combination with a swelling solvent for the polymer to diffuse through the polyester solid polymer or miscible or dispersible in the polymer solution so that contact with the catalyst residues can be made. Also, the acidic organic compounds are characterized by being solvents for the catalyst residues and/or reactive with the metal residues to form water-soluble reaction products. Illustrative of suitable acidic organic compounds for use in the present invention are carboxylic acids containing at least one carboxyl group, acid phosphates and phosphites, sulfonic acids, disulfonylimides and the like. Mixtures of the acidic organic compounds may be employed, if desired.

When the acidic organic compound is employed as an extraction solvent for the metal catalyst residues, a sufficient volume of the extractant should be used to effect the desired residue removal. Catalyst residues may be removed by extraction either from the solid polymer or from a solution. When extracting from a solid polymer, the form of the polymer is immaterial except that the catalyst residues may be extracted at a faster rate when the ratio of surface to volume of the polymer is made larger. In certain instances, it may be desirable to employ, in combination with the acidic organic compounds, other solvents such as solvents which act to swell the polymer thereby facilitating diffusion of the mixture of solvents into and out of the polymer. These solvents may often be used together with the acid organic compound in amounts up to about 95% by weight or more, so long as the concentration of acid organic compound is sufficient to extract or put the catalyst residue in extractable form. Exemplary of solvents which swell the polymers are liquid alkane solvents such as pentane, hexane and heptane, alcoholic solvents such as the lower alkanols, phenols, acetic anhydride and the like solvents. It may be desirable to employ elevated temperatures for the extraction; however, use of high temperatures over a prolonged period of time may cause a reduction in polymer viscosity. Therefore, the catalyst removal and subsequent processing should be done below temperatures at which substantial degradation occurs. The solvent extraction may be done at atmospheric, subatmospheric or elevated pressures. The choice or particular reaction conditions will depend largely on the solvent used and on the extent to which the solvent attacks the polymer under the reaction conditions. Generally speaking, reaction conditions which favor maximum removal of catalyst residues in the shortest possible contact time are those involving the highest possible temperature and the smallest polymer particle size.

Separation of the extractant containing the dissolved metal catalyst residue can be accomplished by any means known to the art. Most conveniently, the separation is effected by washing with water.

Conversion of the metal residues to a water-soluble reaction product is conveniently effected by dissolving the polymer in a water-immiscible organic solvent such as methylene chloride, chloroform, benzene and the like and then adding the acidic organic compound of the invention. The resulting water-soluble metal compounds can then be easily extracted with water, for instance, by a continuous liquid-liquid extraction. The purified polymer can then be recovered by evaporation of the solvent or by precipitation of the polymer in a non-solvent such as methanol.

The contacting of the polymer with the acidic organic compound, either by the solvent extraction method or reaction to water-soluble reaction product form, can be conducted at ambient or room temperatures. It is preferred, however, particularly when extracting the catalyst residue from solid polymer, to conduct the contacting at elevated temperatures, for instance, up to 200° C.

The polyesters treated in accordance with the process of the invention are the linear polymer products prepared by reacting at least one dicarboxylic acid or derivatives thereof (e.g., esters and anhydrides) with at least one glycol in the presence of a conventional metal condensation catalyst in accordance with processes well known in the art. The polyesters may be prepared by direct esterification of the glycol and dibasic acid or alternatively the polyesters may be prepared by ester interchange. In general, the polyesters of the invention have an inherent viscosity of at least 0.3 (as measured in a 60/40 phenol and tetrachloroethane mixture) and a metal condensation catalyst residue content of at least about 25 or 50 parts per million (p.p.m.) based on the metal.

Glycols employed to prepare the polyesters may have an aliphatic or aromatic structure. The preferred glycols are the saturated alkylene glycols having 2 to 20 carbon atoms per molecule and the saturated polyoxyalkylene glycols having 2 to 30 repeating oxyalkylene groups, each group of which having 2 to 4 carbon atoms. Among the aliphatic glycols which may be conveniently employed are:

ethylene glycol;
1,2-propanediol;
1,3-propanediol;
2,2-dimethyl-1,3-propanediol;
1,3-butanediol;
1,4-butanediol;
2,3-butanediol;
2-methyl-1,4-butanediol;
2-methyl-1,5-pentanediol;
2,2,4-trimethyl-1,3-pentanediol;
1,5-hexanediol;
2-methyl-1,5-pentanediol;
2-ethylene-1,3-hexanediol;
3-methyl-1,6-hexanediol;
2-ethyl-1,10-decanediol;
2,5-dimethyl-1,6-hexanediol;

the higher polymethylene glycols having 2 to 20 carbon atoms per molecule and any of the corresponding branched chain glycols, secondary glycols and the like. Among the aliphatic glycols which are useful are cycloalkane glycols such as: 1,2-cyclohexanedimethanol; 1,2-dihydroxycyclohexane; 1,3-cyclohexanedimethanol; quinitol; 1,3-dihydroxycyclohexane; 1,4-cyclohexanedimethanols; 1,4-dihydroxycyclohexane; 2,5-or 2,6-norcamphanediols; the 2,5- or 2,6-norcamphanedimethanols; 2,2,4,4-tetramethyl-1,3-cyclobutanediol and the like. Among the aromatic glycols may be mentioned the alpha, alpha'-dihydroxyxylenes; 4,4'-isopropylidenediphenol and the like.

The dicarboxylic acids which may be employed to prepare the polyesters may also be aliphatic or aromatic. Typical aliphatic dicarboxylic acids are: malonic acid, succinic acid, glutaric acid, adipic acid, pimelic acid, suberic acid, azelaic acid, sebacic acid, and any of the polymethylene dicarboxylic acids having 3 to 20 carbon atoms per molecule. Branched chain aliphatic dicarboxylic acids are also operable in this invention and, therefore, include compounds such as: dimethyl malonic acid, ethyl succinic acid, 2,2-dimethylsuccinic acid, 2-methyladipic acid and the like.

The preferred dicarboxylic acids are those in which the carboxylic acid groups are attached directly to an aromatic or cycloaliphatic ring and separated by at least three atoms. The rings may contain from 5 to 6 atoms at least four of which are carbon atoms and two or more rings may be fused, as in the naphthalene nucleus, or joined by a direct bond or by a divalent radical such as: —$CH_2$—, —$(CH_2)_2$—, $C(CH_3)_2$—, —O—, —$OCH_2$—, $O(CH_2)_nO$—, —S—, —$SO_2$—, etc.

as in the diphenylene or sulfonyl diphenylene radicals. Representative of dicarboxylic acids suitable for use in the invention are terephthalic acid; 2,6-naphthalenedicarboxylic acid; trans-1,4-cyclohexanedicarboxylic acid; 5-tert-butylisophthalic acid; 4,4'-diphenic acid; 4,4'-sulfonyldibenzoic acid; isophthalic acid; 1,3-cyclopentanedicarboxylic acid; 2,5-norbornanedicarboxylic acid; 2,5-tetrahydrofurandicarboxylic acid; 4,4'-ethylenedioxydibenzoic acid; 4,4'-ethylenedibenzoic acid; azelaic acid, and the like. Such dicarboxylic acids as are contemplated generally contain from about 6 to 40 carbon atoms. Mixtures of two or more acids can be incorporated in the polyester compositions contemplated by this invention. In particular, mixtures of an aliphatic dicarboxylic acid such as adipic or sebacic acid and an aromatic acid are valuable.

Within the scope of the polyesters contemplated by this invention are homopolyesters, copolyesters, block polyesters, polyester grafts and polyester blends with themselves and with other polymer types. Thus, we contemplate not only polyesters such as poly(ethylene terephthalate), poly(1,4-cyclohexylenedimethylene terephthalate), and poly(2,2,4,4-tetramethyl-1,3-cyclobutylene terephthalate), but also copolyesters and block polyesters of the above and blends of these materials with other polymer types such as polyamides, etc.

The metallic catalyst residues which are removed as a result of the treatments described herein are in general residues or compounds of those metals which are well documented in the art as being catalysts for the preparation of polyesters. Typical metal catalysts employed are organic or inorganic compounds of arsenic, cobalt, tin, antimony, zinc, titanium, magnesium, calcium, manganese, gallium, sodium, lithium and the like. Generally, the metal content is reduced to less than about 100 p.p.m. of active metal and preferably to less than about 50 p.p.m. of active metal. By "active metal" is meant a metal which catalyzes either ester interchange or polymer buildup reactions.

The following examples are included to further illustrate the present invention.

EXAMPLE I

A copolyester of terephthalic acid containing 50 mole percent of 1,4-cyclohexanedimethanol and 50 mole percent of 2,2,4,4-tetramethyl-1,3-cyclobutanediol was extracted with glacial acetic acid according to the following procedure: 300 g. of the copolyester in 3 mm. granules were covered with glacial acetic acid in a 2000 ml. beaker. The beaker was covered with a watch glass and the mixture was heated for 3.5 hours on a steam bath within occasional stirring. The acetic acid was filtered off while hot and the polymer was washed with several portions of hot, demineralized water. It was dried over the weekend in a vacuum oven at 76° C. The treated polymer contained 48 p.p.m. Sn while the original polymer contained 295 p.p.m. Sn.

A moisture susceptability test was run on both the treated and untreated polymers. The test was performed as follows: The initial flow rate of the dried acid-treated polymer was determined in a Tinius-Olsen extrusion plastometer at 275° C. using a 2160 g. weight and an orifice size of 0.0825 in. The value obtained was 5.3 g. per 10 minutes. The dried polymer was then exposed to the room atmosphere for 3.5 hours and the percent weight gain and flow rate were determined. The weight gain was 0.15% and the flow rate was 5.5 g. per 10 minutes.

The polymer before acid treatment has a flow rate of 5. 5g. per 10 minutes. The weight gain after 3.5 hours' exposure to the room atmosphere was 0.12% and the flow rate had increased to 9.7 g. per 10 minutes. This increase in flow rate (decrease in melt viscosity) shows that the untreated polymer is breaking down in molecular weight. The treated polymer is obviously much more resistant to hydrolysis.

EXAMPLE II

The base polymer of Example I was treated with an acetic acid-cyclohexane mixture. A mixture of 100 g. of the polymer granules was heated 3.5 hours in a flask on the steam bath with 80 ml. cyclohexane and 320 ml. of glacial acetic acid. The mixture was filtered while hot and the polymer was washed twice with methanol and finally washed well with demineralized water. The polymer was dried overnight in a vacuum oven at 75° C. The polymer contained 35 p.p.m. Sn.

EXAMPLE III

The base polymer of Example I was treated with an acetic acid-acetic anhydride mixture. A mixture of 180 g. of the polymer granules was heated 3.5 hours on the steam bath with 500 ml. of a 50/50 mixture of acetic acid and acetic anhydride. The mixture was filtered while hot and the polymer was washed with two portions of methanol. Then the polymer was washed well with hot, demineralized water and dried 18 hours in a circulating air oven at 110° C. The polymer contained 35 p.p.m. Sn.

EXAMPLE IV

A polymer having the same composition as the copolymer of Example I but containing 190 p.p.m. tin was heated with a 5% chloroform-95% acetic acid mixture on a steam bath. A mixture of 110 g. of the polymer granules was heated on the steam bath for 3.5 hours with 400 ml. of the chloroform-acetic acid mixture. The mixture was filtered hot and the polymer was washed twice with methanol and then with hot, demineralized water. The polymer was dried overnight in the 75° C. vacuum oven. The final polymer contained 40 p.p.m. Sn.

EXAMPLE V

Treatment of the base polymer of Example I with isobutyric acid rather than acetic acid produces a polymer containing less than about 50 p.p.m. Sn and the same order of stability as that shown by the polymer of Example I.

EXAMPLE VI

A copolyester of terephthalic acid containing 80 mole percent of 2,2,4,4-tetramethyl-1,3-cyclobutanediol and 20 mole percent of ethylene glycol was extracted with glacial acetic acid according to the following procedure: A mixture of 140 g. of the above copolymer with 600 ml. of a 50/50 mixture of acetic acid-water was heated at about 93° C. for 3.5 hours in a 1000 ml. beaker on the steam bath. The mixture was filtered while hot and the polymer was washed well with demineralized water. Injection molded specimens of the dried polymer exhibited higher impact strength than similar specimens prepared from an untreated polymer.

EXAMPLE VII

A mixture of 50 g. of poly(ethylene terephthalate) in the form of 20 mesh granules and 150 ml. of glacial acetic acid was heated 6 hours in a covered beaker on a steam bath. The mixture was filtered while hot and was washed well with demineralized water. The catalyst analysis on the molded button showed less than 5 p.p.m. each of zinc and antimony. The original polymer contained 69 p.p.m. zinc and 135 p.p.m. antimony.

In order to demonstrate the improved hydrolytic stability of the catalyst extracted composition comparative samples were heated in water at 110° C. for periods of 24 and 113 hours. The viscosities of the control and acid-treated polymers are recorded in the table below:

| Heating time at 110° C., hour | Control | | Acid-treated polymer | |
|---|---|---|---|---|
| | I.V. | Decrease in I.V., percent | I.V. | Decrease in I.V., percent |
| 0 | 0.65 | | 0.62 | |
| 24 | 0.44 | 32 | 0.51 | 18 |
| 113 | 0.22 | 66 | 0.26 | 42 |

EXAMPLE VIII

A 50 g. sample of solid phase process poly(ethylene terephthalate), I.V. 0.60, was extracted with 500 ml. glacial acetic acid for 5 hours in a Soxhlet extractor at a rate of about 15 cycles per hour. After extraction, the powder was washed well with distilled water and acetone and it was then dried 2 hours in a vacuum oven at 110° C. The following data were obtained on the original and extracted polymer:

| Property | Original polymer | Extracted polymer |
|---|---|---|
| I.V. | 0.60 | 0.58 |
| Metals, p.p.m.: | | |
| Zn | 47 | <5 |
| Sb | 227 | 28 |

Thermal and hydrolytic stability tests were run on both the treated and untreated polymers. The stability is expressed in the table below as the percent of broken bonds, based on drop in inherent viscosity, after exposure in water for 16 hours at 120° C. (hydrolytic stability) or for 1 hour under nitrogen at 295° C. (thermal stability). A low value for percent broken bonds indicates good stability:

| Sample | Percent broken bonds | |
|---|---|---|
| | Hydrolytic stability test | Thermal stability test |
| Control polymer | 0.39 | 0.23 |
| Extracted polymer | 0.22 | 0.13 |

The equation for calculating the percent broken bonds is given below:

$$\text{The percent broken bonds} = K \frac{[N]_0 - [N]_h}{[N]_0 \times [N]_h}$$

where

K = a variable dependent on the molecular weight-inherent viscosity relationship,
$[N]_0$ = inherent viscosity of original sample,
$[N]_h$ = inherent viscosity of hydrolyzed or heated sample.

EXAMPLE IX

A 50 g. sample of melt processed poly(ethylene terephthalate) ground to pass a 20 mesh screen was extracted with acetic acid and processed as in Example VIII. The following data were obtained on the treated and control polymers:

| Property | Control | Extracted polymer |
|---|---|---|
| I.V. (inherent viscosity) | 0.66 | 0.65 |
| Metals, p.p.m.: | | |
| Zn | 77 | <5 |
| Sb | 430 | 13 |
| Color, Rd.,a percent | 79.0 | 86.5 |
| Acetaldehyde, wt./wt. percent: | | |
| Free | 0.0022 | 0.0014 |
| Formed at 280° C. on preheated sample | 0.025 | 0.009 |
| Cyclic trimer content, wt. percent | 0.58 | 0.04 | a Color determined on the Gardner Color Difference Meter.

The above data indicate that treatment with acetic acid gave catalyst removal, color improvement, reduction in the amount of acetaldehyde, and a reduction of the amount of cyclic trimer content.

Formation of acetaldehyde is deleterious because it leads to formation of color in the polymer. Not only was cyclic trimer removed, but on subsequent remelting it was not reformed by re-equilibration of the linear polymer. Elimination of cyclic trimer is advantageous due to the difficulties it causes in processing fibers and film, for example, where it builds up on guides and rolls.

EXAMPLE X

A sample of the copolyester of terephthalic acid described in Example I was extracted with acetic acid at 75° C. for 3 hours. The tin content was reduced from about 280 p.p.m. to about 47 p.p.m. and the inherent viscosity was 0.67. Plaques, about 4" x 6", were molded from both the treated and untreated polymers at various temperatures. Two plaque molds were used, No. 15, a luggage grain mold, and No. 1, a leather grain mold. The plaques were then subjected to a ball-drop impact test at 73° F. The data on the ball-drop impact tests are recorded for both the untreated and treated polymers:

| Polymer | Temp., ° F. | Plaque mold | Ball drop impact, ft. lb. | |
|---|---|---|---|---|
| | | | 73° F. | 0° F. |
| Untreated | 581 | No. 15 | 21 | 4 |
| | | No. 1 | 7 | 2 |
| Treated | 590 | No. 15 | 40 | 40 |
| | | No. 1 | 39 | 26 |

These data indicate a decided advantage for the treated polymer in retention of impact strength.

EXAMPLE XI

Titanium catalyst residues are extracted from the polyester, poly 2,2-dimethyl-1,3-trimethylene terephthalate, by treatment with acetic acid as described in Example I. The polymer had been prepared from dimethyl terephthalate and 2,2-dimethyl-1,3-propanediol using titanium tetraisopropoxide as catalyst. The titanium content of the polymer is reduced from 150 parts per million to 40 parts per million by the acid treatment. The treated polymer shows improved thermal and hydrolytic stability.

EXAMPLE XII

A copolyester consisting of equimolar amounts of 1,4-tetramethylene terephthalate and 1,4-tetramethylene isophthalate units is treated with acetic acid by the procedure described in Example I. The copolymer had been prepared from the methyl esters of the acids and 1,4-butanediol using $MgTi(OBu)_6$ as catalyst. The metal content of the treated polymer is reduced from 186 parts per million to 60 parts per million. Resistance to oxidative, hydrolytic, and thermal degradation is improved by removing the catalyst residues.

EXAMPLE XIII

The polyester of terephthalic acid with 2,2,4,4-tetramethyl-1,3-cyclobutanediol was extracted with glacial acetic acid as follows: 200 g. of this polymer were heated with 600 ml. of glacial acetic acid on the steam bath at 90 to 92° C. for 3 hours in a beaker covered with a watch glass. The acetic acid was filtered off while hot and the polymer was washed with several portions of hot, demineralized water. It was dried in a circulating air oven at 110° C. for 16 hours. The treated polymer contained 24 p.p.m. tin by X-ray fluorescence analysis while the untreated polymer contained 445 p.p.m. tin. The treated polymer was successfully molded at 685° C. and 1200 p.s.i. to give molded specimens having a notched Izod impact strength of 2.5 ft. lb./in. of notch whereas untreated polymer showed a notched Izod impact strength of only 0.62 ft. lb./in. of notch.

The following polyesters are also treated with acetic acid as described in Example I and the metal content is reduced as shown in the following table:

TABLE

| Example | Polyester repeat unit | Catalyst used in polymer preparation | | 
|---|---|---|---|
| | | Composition | Amount, p.p.m. of metal based on polymer | Metal content of treated polymer, p.p.m. |
| 14 (XIV) | [−C(=O)−⌬S−CH₂O−]  | Ti(OBu)₄ | 125 | 24 |
| 15 (XV) | [−C(=O)−⌬−SO₂−⌬−C(=O)−O(CH₂)₅O−] | NaHTi(OBu)₆ | 164 | 33 |
| 16 (XVI) | [−C(=O)−(naphthalene)−C(=O)−OCH₂CH₂O−] | Zn(OAc)₂, Sb₂O₃ | 100 / 250 | <5 / 20 |
| 17 (XVII) | [−C(=O)−⌬S−CH₂O−]₄ [−C(=O)−⌬−C(=O)−OCH₂CH₂O−]₁ | Zn(OAc)₂, Sb₂O₃ | 120 / 300 | 18 / 46 |
| 18 (XVIII) | [−C(=O)−⌬S−CH₂O−] | Ti(O isoPr)₄ | 141 | 35 |
| 19 (XIX) | [−C(=O)−⌬S−CH₂O−]₁₀ [−C(=O)−⌬S−CH₂O−]₁ | MgTi(O isoPr)₆ | 194 | 62 |
| 20 (XX) | [−C(=O)−⌬−C(=O)−OCH₂CH₂O−]₁₀ [−C(=O)−(phenyl)−C(=O)O−]₁ | Zn(OAc)₂, Ga(OAc)₃, Co(OAc)₂ | 41 / 14 / 54 | 7 / <5 / 5 |
| 21 (XXI) | [−C(=O)−⌬(Cl,Cl)−C(=O)−O(CH₂)₄O−] | Ti(C isoPr)₄ | 107 | 38 |
| 22 (XXII) | [−C(=O)−⌬S−CH₂O−]₃ [−C(=O)−C(CH₂)₈C(=O)−OCH₂−⌬S−CH₂−]₁₇ | Bu₂SnO | 250 | 35 |
| 23 (XXIII) | [−C(=O)−⌬S−CH₂O−]₅ [−C(=O)−⌬−C(=O)−OCH₂−⌬S−CH₂O−]₁ | MgTi(O isoPr)₆ | 203 | 27 |

In Examples XIV, XIX, XXII and XXIII, a 9/1 mixture of acetic anhydride/acetic acid is used rather than acetic acid alone to extract the catalyst residues. The treated polymers in Examples XV–XXIII all show improved oxidative and hydrolytic stability when compared with the untreated controls.

EXAMPLE XXIV

A polyester prepared from dimethyl trans-cyclohexane-1,4-dicarboxylate and 2,2-dimethyl-1,3-propanediol and having an inherent viscosity of 0.73 is dissolved in chloroform containing 5% by volume of formic acid. The polyester contains 141 parts per million titanium metal in the form of catalyst residues remaining in the polymer from the use of $Ti(O\ isoPr)_4$ as catalyst. The chloroform solution is extracted with water by passing a slow stream of water through a glass tube inserted below the surface of the chloroform solution contained in a beaker and allowing the water to overflow the sides of the beaker continuously for 4 hours. The chloroform layer is then separated and the polymer recovered by precipitation in methanol. The treated polymer has an inherent viscosity of 0.75 and contains 12 parts per million of titanium. The hydrolytic stability of the polymer is greatly improved by thus removing the greater portion of the catalyst residues.

EXAMPLE XXV

The terephthalate copolyester (10 g.) made from a glycol mixture containing 80 mole percent 4,4′-isopropylidenediphenol and 20 mole percent 2,2-dimethyl-1,3-propanediol and containing 340 p.p.m. tin was heated at reflux with a mixture of 285 ml. acetic anhydride and 15 ml. glacial acetic acid for about 3.5 hours. The polymer was then filtered off, washed thoroughly with demineralized water and dried at 130° C. in a vacuum oven for 23 hours. The treated polymer contained 9 p.p.m. tin by X-ray fluorescence analysis. The final inherent viscosity was 1,24 and that of the original polymer was 1.31.

As is apparent from the above examples, this invention provides, among other things, a process for improving the thermal and hydrolytic stability properties of a linear polymeric polyester containing residues of metal condensation catalyst employed in the preparation of said polyester which comprises contacting said polyester with a treating agent comprising an organic compound capable of existing as a carboxylic acid in water and having an ionization constant of about $2 \times 10^{-1}$ to $2.5 \times 10^{-6}$ and sufficient solvent power to diffuse through the polyester to contact said residues whereby said residues of metal condensation catalyst are inactivated or are in a form removable from said polyester and separating any of said removable residues and said treating agent from said polyester to recover the improved polyester.

This process produces a polyester of improved thermal and hydrolytic stability.

The invention has been described in detail with particular reference to preferred embodiments thereof, but it will be understood that variations and modifications can be effected within the spirit and scope of the invention.

We claim:

1. A process for improving the thermal and hydrolytic stability properties of a linear polymeric polyester having an inherent viscosity of at least 0.3 containing residues of metal condensation catalyst employed in the preparation of said polyester which comprises
   (A) contacting the polyester with a treating agent selected from the group consisting of acetic acid, acetic anhydride, isobutyric acid and formic acid, and
   (B) separating the metal residues and treating agent from the polyester to substantially reduce the content of the metal residues in the polyester.

2. The process of claim 1 wherein the treating agent is acetic acid or acetic anhydride.

3. The process of claim 1 wherein the metal residues are separated from the polyester to reduce the metal residue content to less than about 50 p.p.m.

4. The process of claim 1 wherein
   the polyester is poly(ethylene terephthalate),
   the metal residue comprises antimony and zinc, and
   the treating agent is acetic acid.

5. The process of claim 1 wherein
   the polyester is poly(1,4-cyclohexylenedimethylene terephthalate),
   the metal residue comprises titanium, and
   the treating agent is acetic acid or acetic anhydride.

6. The process of claim 1 wherein
   the polyester is poly(tetramethylene terephthalate),
   the metal residue comprises magnesium and titanium, and
   the treating agent is acetic acid or acetic anhydride.

7. The process of claim 1 wherein the polyester is in solid form.

8. A process for improving the thermal and hydrolytic stability properties of a linear polymeric polyester having an inherent viscosity of at least 0.3 containing residues of metal condensation catalyst employed in the preparation of said polyester which comprises
   (A) contacting a solution of the polyester in a water-immiscible organic solvent with a treating agent to convert the metal residues to a water-soluble reaction product, the treating agent selected from the group consisting of acetic acid, acetic anhydride, isobutyric acid and formic acid, and
   (B) separating the water soluble reaction product from the polyester by extraction with water to substantially reduce the content of the metal residues in the polyester.

9. The process of claim 8 wherein the water-immiscible organic solvent is methylene chloride, chloroform or benzene.

10. The process of claim 8 wherein the treating agent is acetic acid.

11. The process of claim 8 wherein the metal residues are separated from the polyester to reduce the metal residue content to less than about 50 p.p.m.

12. The process of claim 8 wherein
    the polyester is poly(ethylene terephthalate),
    the metal and residue comprises zinc and antimony, and
    the treating agent is acetic acid.

13. The process of claim 8 wherein
    the polyester is poly(1,4-cyclohexylenedimethylene terephthalate),
    the metal residue comprises titanium, and
    the treating agent is acetic acid or acetic anhydride.

14. The process of claim 8 wherein
    the polyester is poly(tetramethylene terephthalate),
    the metal residue comprises magnesium and titanium, and
    the treating agent is acetic acid or acetic anhydride.

References Cited

UNITED STATES PATENTS

| 3,185,670 | 5/1965 | McKinney | 260—75 |
| 3,347,838 | 10/1967 | Clark | 260—93.7 |
| 3,497,477 | 2/1970 | Barkey et al. | 260—75 |

FOREIGN PATENTS

| 1,141,783 | 1/1969 | Great Britain. |

MELVIN GOLDSTEIN, Primary Examiner

U.S. Cl. X.R.

260—96 R